Oct. 28, 1941.　　　　R. H. SHENK　　　　2,260,920
INTERCEPTOR FOR DRAIN LINES
Filed Dec. 17, 1938

INVENTOR.
Robert H. Shenk
BY
ATTORNEYS.

Patented Oct. 28, 1941

2,260,920

UNITED STATES PATENT OFFICE 2,260,920

INTERCEPTOR FOR DRAIN LINES

Robert H. Shenk, Erie, Pa., assignor to J. A. Zurn Manufacturing Company, Erie, Pa., a corporation of Pennsylvania Application December 17, 1938, Serial No. 246,330

1 Claim. (Cl. 210—56)

This invention relates generally to handle clamps for securing and removing covers and more particularly to handle clamps for securing and removing covers from interceptors in drain lines.

All devices of this character made according to the teachings of the prior art, and with which I am familiar, have had separate handles for removing covers from receptacles and other means for securing the covers to the receptacles. In receptacles where it was necessary to remove and clean filtering baskets such as a grease interceptor in a drain line, it has been difficult to provide means for securing the cover to the receptacle, especially where the cover of the receptacle had to be on the level with an adjacent floor. These prior devices took considerable time to unsecure the covers and were very inefficient.

It is, accordingly, an object of my invention to overcome the above and other defects in handle clamps for receptacles and it is more particularly an object of my invention to provide means for clamping the cover onto a receptacle which means is utilized to remove the cover from the receptacle.

Another object of my invention is to provide a filtering basket in a grease interceptor which may be removed with the cover on the receptacle which retains the filtering basket.

Another object of my invention is to provide a means for removing and securing a filtering basket and a cover on a grease interceptor in a drain line which is simple in construction, easy to manufacture, cheap in cost, and which is easy to remove and clean.

Another object of my invention is to provide means for removing and securing the cover of a receptacle which does not project above the face of the cover.

Other objects of my invention will become evident from the following detailed description, taken in conjunction with the accompanying drawing, in which Fig. 1 is a view in cross-section showing the filtering basket and cover secured to the receptacle.

Figure 1:
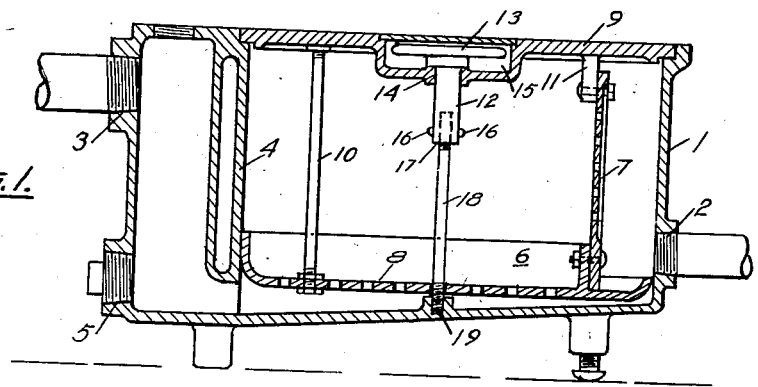
Figure 2:
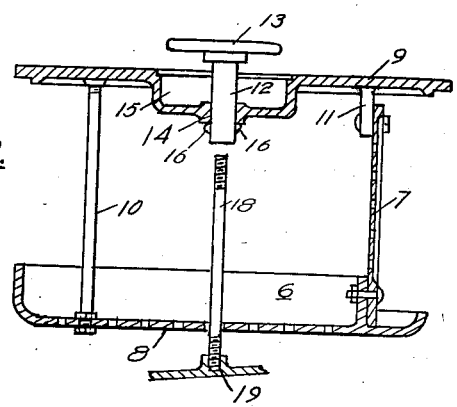
Fig. 2 is a side elevational view of the attached filtering basket and cover shown in Fig. 1 with the handle clamp in a position to remove the cover.
Figure 3:
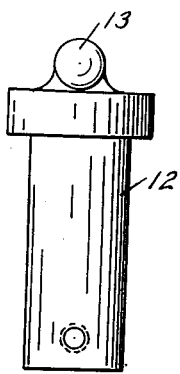
Fig. 3 is an end elevational view of the handle clamp.
Figure 4:
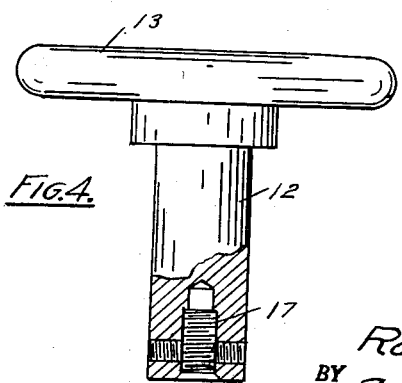
Fig. 4 is a side elevational view of the handle clamp.

Referring to the drawing, Figs. 1 and 2 show a grease interceptor for a drain line comprising a receptacle 1 having an inlet 2 and an outlet 3 and a depending wall 4. A cleanout hole 5 is disposed in the bottom portion of the receptacle 1.

A removable filtering basket 6 comprises a vertical baffle 7 disposed in the path of the incoming liquid flowing through the inlet 2 and a horizontally disposed baffle 8 attached to the vertical baffle 7. The basket 6 depends from the receptacle cover 9 and is attached to the cover 9 by stay 10 and bracket 11. It will be evident that the removal of the cover 9 carries with it the filtering basket 6.

A handle clamp comprising a shank 12 and a handle 13 is disposed in an aperture 14 in the recessed portion 15 of the cover 9. The shank 12 has outwardly projecting members 16 to prevent the retraction of the handle clamp from the aperture 14. A threaded aperture 17 in the shank 12 engages a threaded stud bolt 18 which engages a threaded aperture 19 in the bottom portion of the receptacle 1.

In operation, the cover 9 is placed on the receptacle 1 with the filtering basket 6 depending therefrom as shown by Fig. 1. The handle clamp is then rotated to engage the threaded portion of the stud bolt 18 and clamp the cover 9 onto the receptacle 1 as shown in Fig. 1. It will be noted that the handle 13 of the handle clamp is below the level of the face of the cover 9. When it is desired to remove the filtering basket 6 for cleaning, the handle clamp is rotated so as to release the threaded portion 17 in the shank 12 from the threaded portion of the bolt 18. The handle clamp then moves outwardly to a position shown in Fig. 2 wherein the outwardly projecting portions 16 on the shank 12 of the handle clamp engages the cover 9 through the underside of the recessed portion 15 whereby the cover 9 with its depending filtering basket 6 is removed from the receptacle 1.

It will be evident that I have provided a handle clamp for a receptacle which secures the cover to the receptacle as well as providing a suitable means for removing the cover from the receptacle.

Various changes may be made in the specific embodiment of the present invention without departing from the spirit thereof, or from the scope of the appended claim.

What I claim is:

In an interceptor, in combination, a receptacle having a centrally located threaded recess in the inner bottom portion thereof, a cover for said receptacle having a centrally located aperture and a recess portion immediately adjacent thereof, a filtering basket depending from said cover and connected thereto, a handle clamp for clamping and for removing said filtering basket and said cover from said receptacle comprising a shank portion extending through said aperture in said cover having an axially extending threaded recess and a handle portion, said handle portion normally nesting in the recess portion of said cover, outwardly projecting members on the shank of said handle on the end of said shank opposite to said handle portion, and on the opposite side of said cover for retaining said handle clamp in said aperture, and means engaging the threaded recess in the shank portion of said handle clamp and said threaded recess in said receptacle to secure said cover and its depending filtering basket in said receptacle.

ROBERT H. SHENK.